US008019580B1

(12) United States Patent
Chandra et al.

(10) Patent No.: US 8,019,580 B1
(45) Date of Patent: Sep. 13, 2011

(54) TRANSIENT THERMAL ANALYSIS

(75) Inventors: Rajit Chandra, Cupertino, CA (US); Paolo Carnevali, San Jose, CA (US); John Yanjiang Shu, Livermore, CA (US); Adi Srinivasan, Fremont, CA (US)

(73) Assignee: Gradient Design Automation Inc., Santa Clara, CA (US)

( * ) Notice: Subject to any disclaimer, the term of this patent is extended or adjusted under 35 U.S.C. 154(b) by 823 days.

(21) Appl. No.: 12/101,983

(22) Filed: Apr. 12, 2008

Related U.S. Application Data

(60) Provisional application No. 60/911,516, filed on Apr. 12, 2007, provisional application No. 60/917,185, filed on May 10, 2007.

(51) Int. Cl.
  G06G 7/48 (2006.01)
  G06F 17/50 (2006.01)
(52) U.S. Cl. .............................................. 703/6; 703/13
(58) Field of Classification Search .................. 703/6, 13
  See application file for complete search history.

(56) References Cited

U.S. PATENT DOCUMENTS

| | | | |
|---|---|---|---|
| 4,696,578 | A | 9/1987 | Mansuria et al. |
| 5,654,904 | A | 8/1997 | Thakur |
| 5,710,068 | A | 1/1998 | Hill |
| 5,831,249 | A | 11/1998 | Rohner et al. |
| 5,838,578 | A | 11/1998 | Pippin |
| 5,927,853 | A | 7/1999 | Christiaens et al. |
| 5,997,174 | A | 12/1999 | Wyland |
| 6,124,635 | A | 9/2000 | Kuwabara et al. |
| 6,172,337 | B1 | 1/2001 | Johnsgard et al. |
| 6,203,191 | B1 | 3/2001 | Mongan |
| 6,247,161 | B1 | 6/2001 | Lambrecht et al. |
| 6,320,201 | B1 | 11/2001 | Corbett et al. |
| 6,334,013 | B1 | 12/2001 | Laming et al. |
| 6,389,582 | B1 | 5/2002 | Valainis et al. |
| 6,505,326 | B1 | 1/2003 | Farral et al. |

(Continued)

FOREIGN PATENT DOCUMENTS

WO 2007/019531 A2 2/2007

(Continued)

OTHER PUBLICATIONS

Li et al.: Efficient Full-Chip Thermal Modeling and Analysis; IEEE/ACM International Conference on Computer Aided Design ICCAD-2004; 2004, pp. 319-326.*

(Continued)

*Primary Examiner* — Hugh Jones
(74) *Attorney, Agent, or Firm* — PatentVentures; Bennett Smith; Korbin Van Dyke

(57) ABSTRACT

Transient thermal simulation of semiconductor chips uses region-wise variable spatial grids and variable temporal intervals, enabling spatio-temporal thermal analysis of semiconductor chips. Temperature rates of change across a die and/or package of an integrated circuit are computed and tracked versus time. Critical time interval(s) for temperature evaluation are determined. Temperatures of elements, components, devices, and interconnects are updated based on a 3D full chip temperature analysis. Respective power dissipations are updated, as a function of the temperatures, with an automated interface to one or more circuit simulation tools. Subsequently new temperatures are determined as a function of the power dissipations. User definable control and observation parameters enable flexible and efficient transient thermal analysis. The parameters relate to power sources, monitoring, reporting, error tolerances, and output snapshots. Viewing of waveform plots and 3D spatial variations of temperature enable efficient communication of results of the thermal analysis with designers of integrated circuits.

10 Claims, 11 Drawing Sheets

U.S. PATENT DOCUMENTS

| | | |
|---|---|---|
| 6,532,570 B1 | 3/2003 | Mau |
| 6,591,399 B1 | 7/2003 | Wyrzykowska et al. |
| 6,591,402 B1 | 7/2003 | Chandra et al. |
| 6,634,013 B2 | 10/2003 | Shinzawa |
| 6,662,345 B2 | 12/2003 | Uchida et al. |
| 6,751,781 B2 | 6/2004 | Lin et al. |
| 6,769,102 B2 | 7/2004 | Frank et al. |
| 6,910,812 B2 | 6/2005 | Pommer et al. |
| 6,931,369 B1 | 8/2005 | Perry et al. |
| 6,993,742 B2 | 1/2006 | Fryer et al. |
| 7,025,280 B2 | 4/2006 | Kaushal et al. |
| 7,039,888 B2 | 5/2006 | Steinmann et al. |
| 7,096,450 B2 | 8/2006 | Gill et al. |
| 7,162,402 B2 | 1/2007 | Daems et al. |
| 7,171,346 B1 | 1/2007 | Recker et al. |
| 7,191,112 B2 | 3/2007 | Demler et al. |
| 7,191,413 B2 | 3/2007 | Chandra et al. |
| 7,194,711 B2 | 3/2007 | Chandra |
| 7,203,920 B2 | 4/2007 | Chandra |
| 7,263,477 B2 | 8/2007 | Chen et al. |
| 7,353,471 B1 | 4/2008 | Chandra et al. |
| 7,383,520 B2 | 6/2008 | Chandra |
| 7,401,304 B2 | 7/2008 | Li et al. |
| 2001/0032330 A1 | 10/2001 | Kusunoki |
| 2002/0050833 A1 | 5/2002 | Jones et al. |
| 2003/0145296 A1 | 7/2003 | Chandra et al. |
| 2003/0226122 A1 | 12/2003 | Hathaway et al. |
| 2005/0044515 A1 | 2/2005 | Acar et al. |
| 2005/0058178 A1 | 3/2005 | Shih et al. |
| 2005/0138581 A1 | 6/2005 | Usui |
| 2005/0149886 A1 | 7/2005 | Kaushal et al. |
| 2005/0155004 A1 | 7/2005 | Miura et al. |
| 2005/0166166 A1 | 7/2005 | Chandra et al. |
| 2005/0166168 A1 | 7/2005 | Chandra |
| 2005/0210425 A1 | 9/2005 | Keller et al. |
| 2006/0031794 A1 | 2/2006 | Li et al. |
| 2007/0120239 A1 | 5/2007 | Chandra |
| 2007/0157137 A1 | 7/2007 | Chandra |

FOREIGN PATENT DOCUMENTS

| | | |
|---|---|---|
| WO | 2007/019531 A3 | 2/2007 |
| WO | 2007/070879 A1 | 6/2007 |

OTHER PUBLICATIONS

The International Technology Roadmap for Semiconductors, 2003 Edition, Executive Summary, published by the Semiconductor Industry Association et al., 2003; 75 pages.

The International Technology Roadmap for Semiconductors, 2003 Edition, System Drivers, published by the Semiconductor Industry Association et al., 2003; 24 pages.

The International Technology Roadmap for Semiconductors, 2003 Edition, Design, published by the Semiconductor Industry Association et al., 2003; 43 pages.

The International Technology Roadmap for Semiconductors, 2003 Edition, Test and Test Equipment, published by the Semiconductor Industry Association et al., 2003; 63 pages.

The International Technology Roadmap for Semiconductors, 2003 Edition, Process Integration, Devices and Structures; Includes RF and Analog/Mixed-Signal Technologies for Wireless Communications and Emerging Research Devices, published by the Semiconductor Industry Association et al., 2003; 41 pages.

The International Technology Roadmap for Semiconductors, 2003 Edition, Radio Frequency and Analog/Mixed-Signal Technologies for Wireless Communications [A Section of the Process Integration Chapter], published by the Semiconductor Industry Association et al., 2003; 40 pages.

The International Technology Roadmap for Semiconductors, 2003 Edition, Emerging Research Devices, published by the Semiconductor Industry Association et al., 2003; 53 pages.

The International Technology Roadmap for Semiconductors, 2003 Edition, Front End Processes, published by the Semiconductor Industry Association et al., 2003; 62 pages.

The International Technology Roadmap for Semiconductors, 2003 Edition, Lithography, published by the Semiconductor Industry Association et al., 2003; 20 pages.

The International Technology Roadmap for Semiconductors, 2003 Edition, Interconnect, published by the Semiconductor Industry Association et al., 2003; 45 pages.

The International Technology Roadmap for Semiconductors, 2003 Edition, Factory Integration, published by the Semiconductor Industry Association et al., 2003; 42 pages.

The International Technology Roadmap for Semiconductors, 2003 Edition, Assembly and Packaging, published by the Semiconductor Industry Association et al., 2003; 24 pages.

The International Technology Roadmap for Semiconductors, 2003 Edition, Environment, Safety, and Health, published by the Semiconductor Industry Association et al., 2003; 27 pages.

The International Technology Roadmap for Semiconductors, 2003 Edition, Yield Enhancement, published by the Semiconductor Industry Association et al., 2003; 39 pages.

The International Technology Roadmap for Semiconductors, 2003 Edition, Metrology, published by the Semiconductor Industry Association et al., 2003; 40 pages.

The International Technology Roadmap for Semiconductors, 2003 Edition, Modeling and Simulation, published by the Semiconductor Industry Association et al., 2003; 27 pages.

Yi-Kan Cheng, Prasun Raha, Chin-Chi Teng, Elyse Rosenbaum, Sung-Mo Kang; Illiads-T: An Electrothermal Timing Simulator for Temperature-Sensitive Reliability Diagnosis of CMOS VLSI Chips; IEEE Transactions on Computer-Aided Design of Integrated Circuits and Systems, vol. 17, No. 8, Aug. 1998, pp. 668-681.

Sven Rzepka, Kaustav Banerjee, Ekkehard Meusel, and Chenming Hu; Characterization of Self-Heating in Advanced VLSI Interconnect Lines Based on Thermal Finite Element Simulation; IEEE Transactions on Components, Packaging, and Manufacturing Technology—Part A, vol. 21, No. 3, Sep. 1998, pp. 406-411.

Yi-Kan Cheng, Ching-Han Tsai, Chin-Chi Teng, Elyse Rosenbaum, Sung-Mo (Steve) Kang; Electrothermal Analysis of VLSI Systems; Kluwer Academic Publishers, 2000, 116 pages.

Kaustav Banerjee, Amit Mehrotra, Alberto Sangiovanni-Vincentelli, Chenming Hu; On Thermal Effects in Deep Sub-Micron VLSI Interconnects; Proceedings of IEEE/ACM DAC 1999, pp. 885-891.

Ting-Yen Chiang, Kaustav Banerjee, Krishna C. Saraswat; Comact Modeling and SPICE-Based Simulation for Electrothermal Analysis of Multilevel ULSI Interconnects; Proceedings of IEEE/ACM ICCAD, 2001, pp. 165-172.

Zhiping Yu, Daniel Yergeau, Robert W. Dutton, Sam Nakagawa, and Jeff Deeney; Fast Placement-Dependent Full Chip Thermal Simulation; Proceedings of International Symposium on VLSI Technology, Systems and Applications, 2001, pp. 249-252.

Haihua Su, Frank Liu, Anirudh Devgan, Emrah Acar, Sani Nassif; Full Chip Leakage Estimation Considering Power Supply and Temperature Variations; ISLPED'03, Aug. 25-27, 2003, Seoul, Korea, pp. 78-83.

Kevin Skadron, Mircea R. Stan, Wei Huang, Sivakumar Velusamy, Karthik Sankaranarayanan, and David Tarjan; Temperature-Aware Microarchitecture; Proceedings of the 30th International Symposium on Computer Architecture, 2003, 12 pages.

Ching-Han Tsai and Sung-Mo (Steve) Kang; Cell-Level Placement for Improving Substrate Thermal Distribution; IEEE Transactions on Computer-Aided Design of Integrated Circuits and Systems, vol. 19, No. 2, Feb. 2000, pp. 253-266.

Brent Goplen and Sachin Sapatnekar; Efficient Thermal Placement of Standard Cells in 3D ICs using a Force Directed Approach; Proceedings of the International Conference on Computer Aided Design (ICCAD'03), pp. 86-89, 2003.

Gary B. Kromann; Thermal Management of a C4/Ceramic-Ball-Grid Array: The Motorola PowerPC603TM and PowerPC604TM RISC Microprocessors; Twelfth IEEE Semi-Thermtm Symposium, 1996, pp. 36-42.

Stephen H. Gunther, Frank Binns, Douglas M. Carmean, Jonathan C. Hall; Managing the Impact of Increasing Microprocessor Power Consumption; Intel Technology Journal Q1, 2001, 9 pages.

Tomas Skalicky; LASPack Reference Manual (version 1.12.2), Dresden University of Technology Institute for Fluid Mechanics, Aug. 13, 1995, 52 pages.

Vivek De and Shekhar Borkar; Technology and Design Challenges for Low Power and High Performance; Proceedings of the International Symposium Low Power Electronics and Design, San Diego, CA, 1999, pp. 163-168.

James R. Black, Electromigration Failure Modes in Aluminum Metallization for Semiconductor Devices; Proceedings of the IEEE, vol. 57, No. 9, Sep. 1969, 14 pages.

Ting-Yuan Wang et al., 3D Thermal-ADI—An Efficient Chip-Level Transient Thermal Simulator, ISPD'03, Apr. 6-9, 2003, Monterey, California, 8 pages.

Ting-Yuan Wang et al., Thermal-ADI—A Linear-Time Chip-Level Dynamic Thermal-Simulation Algorithm Based on Alternating-Direction-Implicit (ADI) Method, IEEE Transactions on Very Large Scale Integration (VLSI) systems, vol. 11, No. 4, Aug. 2003, pp. 691-700.

Ting-Yuan Wang et al., 3D Thermal-ADI: A Linear-Time Chip Level Transient Thermal Simulator, IEEE Transactions on Computer-Aided Design of Integrated Circuits and Systems, vol. 21, No. 12, Dec. 2002, pp. 1434-1445.

Ting-Yuan Wang et al., Thermal-ADI: A Linear-Time Chip-Level Dynamic Thermal Simulation Algorithm Based on Alternating-Direction-Implicit (ADI) Method, ISPD'01, Apr. 1-4, 2001, Sonoma, California, 6 pages.

"Design Flow", Carleton University, Copyright John Knight, Revised; Sep. 30, 2003, pp. 1-22.

"Stratix II High-Speed Development Board", Data Sheet, Altera Corporation, Sep. 2004, ver.1.0, pp. 1-85.

Szekely V. et al.: "A thermal benchmark chip: design and applications", Part A, IEEE Transactions on Components, Packaging, and Manufacturing Technology, vol. 21, No. 3, Sep. 1998, pps. 399-405.

Hang L. et al.: "Efficient thermal stimulation for run-time temperature tracking and management", Computer Design: VLSI in Computers and Processors, ICCD 2005 Proceedings, IEEE International Conference Oct. 2-5, 2005, 4 pages.

International Search Report and Written Opinion for PCT/US2006/062184; mailed 7 May 2007; 11 pages.

Yonghong Yang et al.; Adaptive Chip-Package Thermal Analysis for Synthesis and Design; Design, Automation and Test in Europe, 2006. Date '06. Proceedings; Mar. 6-10, 2006; 6 pgs.

Yonghong Yang et al.; Adaptive multi-domain thermal modeling and analysis for integrated circuit synthesis and design; Computer-Aided Design, ICCAD '06. IEEE/ACM International Conference, Nov. 2006; pgs. 575-582.

Table of Jul. 22, 2009 identifying references used to reject claims in related applications; 1 page.

Kaustav Banerjee et al., High-Current Failure Model for VLSI Interconnects Under Short-Pulse Stress Conditions, IEEE Electron Device Letters, vol. 18, No. 9, Sep. 1997, pp. 405-407.

Kaustav Banerjee et al., The Effect of Interconnect Scaling and Low-k Dielectric on the Thermal Characteristics of the IC Metal, Electron Devices Meeting, 1996, International, Dec. 8-11, 1996, San Francisco, CA, USA, pp. 65-68.

Wei Huang et al., 51.3 Compact Thermal Modeling for Temperature-Aware Design, HPLP and LAVA labs, Departments of ECE and CS, University of Virginia, Jun. 10, 2004, 27 pgs.

Wei Huang et al., Compact Thermal Modeling for Temperature-Aware Design, DAC 2004 Jun. 7-11, 2004, San Diego, California, USA, pp. 878-883.

Amir H. Ajami et al., Analysis of Substrate Thermal Gradient Effects on Optimal Buffer Insertion, Presentation Outline, ICCAD '01, Nov. 5, 2001, 29 slides on 5 pgs.

Amir H. Ajami et al., Analysis of Substrate Thermal Gradient Effects on Optimal Buffer Insertion, ICCAD '01, Proceedings of the 2001 IEEE/ACM international conference on Computer-aided design, Nov. 5, 2001, San Jose, California, pp. 44-48.

Amir H. Ajami et al., Analysis of Non-Uniform Temperature-Dependent Interconnect Performance in High Performance Ics, DAC'01, Jun. 18-22, 2001, Las Vegas, Nevada, USA, 6 pgs.

Kaustav Banerjee et al., Analysis and Optimization of Thermal Issues in High-Performance VLSI, ISPD'01, Apr. 1-4, 2001, Sonoma, California, USA, pp. 230-237.

Kaustav Banerjee et al., Analysis and Optimization of Thermal Issues in High Performance VLSI, Presentation Outline, ISPD 2001, 57 slides on 10 pgs.

Amir H. Ajami et al., Non-Uniform Chip-Temperature Dependent Signal Integrity, Digest of Technical Papers, 2001 Symposium on VLSI Technology, Jun. 12-14, 2001, Kyoto, Japan, 2 pgs.

Amir H. Ajami et al., Effects of Non-uniform Substrate Temperature on the Clock Signal Integrity in High Performance Designs, IEEE Conference on Custom Integrated Circuits, San Diego, CA, USA, May 6-9, 2001, 4 pgs.

Amir H. Ajami et al., Effects of Non-Uniform Substrate Temperature on the Clock Signal Integrity in High Performance Designs, Presentation Outline, CICC'01, May 8, 2001, 26 slides on 5 pgs.

Ting-Yuan Wang et al., Thermal-ADI—A Linear-Time Chip-Level Dynamic Thermal-Simulation Algorithm Based on Alternating-Direction-Implicit (ADI) Method, Poster, University of Wisconsin, 2003, 1 pg.

Ting-Yuan Wang et al., Spice-Compatible Thermal Simulation with Lumped Circuit Modeling for Thermal Reliability Analysis based on Modeling Order Reduction, Proceedings of the 5th International Symposium on Quality Electronic Design, Mar. 22-24, 2004, 6 pgs.

Rajit Chandra, Impact of Thermal Analysis on Large Chip Design, Outline, Electronic Design Process Symposium Monterey, CA, Apr. 7, 2005, 25 pgs.

Peng Li, Efficient Full-Chip Thermal Modeling and Analysis, Proceedings of the 2004 IEEE/ACM International conference on Computer-aided design, Nov. 7-11, 2004, pp. 319-326.

Vladimir Koval et al., MONSTR: a complete thermal simulator of electronic systems, Proceedings of the 31st annual conference on Design Automation, San Diego, California, Jun. 6-10, 1994, 6 pgs.

Rajit Chandra, A thermal-aware IC design methodology, http://www.eetimes.com/showArticle.jhtml?articleID=164302273&printable=true, Jun. 13, 2005, 7 pgs.

Sheng-Chih Lin and Kaustav Banerjee, "Cool Chips: Opportunities and Implications for Power and Thermal Management", IEEE Transactions on Electron Devices, vol, 55, No. 1, Jan. 2008 pp, 245-255.

International Search Report and Written Opinion for PCT/US2006/030940; mailed Aug. 24, 2007; 4 pages.

* cited by examiner

TRANSIENT THERMAL ANALYSIS

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. Provisional Application Ser. No. 60/911,516, filed Apr. 12, 20007, first named inventor Rajit Chandra, and entitled Transient Thermal Analysis; and U.S. Provisional Application Ser. No. 60/917,185, filed May 10, 20007, first named inventor Rajit Chandra, and entitled Transient Thermal Analysis.

BACKGROUND

Advancements in semiconductor chip design are needed to provide improvements in performance, efficiency, and utility of use.

RELATED ART

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

DETAILED DESCRIPTION

Figure 1:
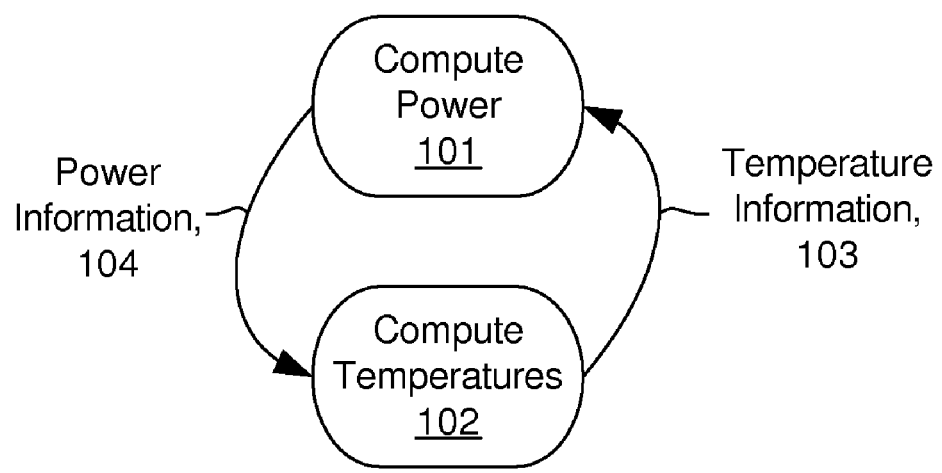
FIG. 1 illustrates a conceptual view of an embodiment of a transient thermal analysis of a semiconductor chip.

A detailed description of one or more embodiments of the invention is provided below along with accompanying figures illustrating selected details of the invention. The invention is described in connection with the embodiments. It is well established that it is neither necessary, practical, or possible to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

Elsewhere herein various shorthand abbreviations, or acronyms, are used to refer to certain elements. The descriptions of at least some of the acronyms follow.

| Acronym | Description |
| --- | --- |
| 2D | Two-Dimensional |
| 3D | Three-Dimensional |
| DC | "Direct Current" (refers to relatively unchanging versus transient; e.g. "steady state") |
| IO | Input/Output |
| PC | Personal Computer |
| PTAT | Proportional To Absolute Temperature |
| RC | Resistor-Capacitor |

Terms

Elsewhere herein various terms are used with respect to various concepts. Examples of at least some of the terms follow.

An example of a steady state condition is a value or circumstance that is relatively unchanging (or completely fixed) for a length of time. An example of a transient condition is a value or circumstance that is changing for a length of time. In some situations, a signal voltage level or a temperature value is a relatively constant value for a first length of time, and then varying values for a second length of time. The level or value is an example of a steady state value during the first length of time, and a transient value during the second length of time. A steady state value, condition, or circumstance is optionally characterized as "DC".

An example of simulation time is passage of time as modeled by a simulator (e.g. nanoseconds transpiring while a transistor switches, as determined by a circuit simulator). In some circumstances, simulation time is continuous and in other circumstances simulation time is discrete (e.g. existing at limited points). An example of advancement of simulation time is when a simulator proceeds from modeling one time to a later time. A simulator operating according to discrete simulation time advances simulation time by, for example, adding a time step value to a current simulation time to produce a next simulation time. An example of a discrete time interval is time that passes from one discrete time to another discrete time, e.g. a time step in length. An example of advancement of a discrete time interval is when a simulator operating according to discrete simulation time advances from one discrete simulation time to a next discrete simulation time.

Transient thermal simulation of semiconductor chips uses region-wise variable spatial grids and temporal intervals, enabling spatio-temporal thermal analysis of semiconductor chips. Temperature rates of change across a die and/or package of an integrated circuit are computed and tracked versus time. Critical time interval(s) for temperature evaluation are determined Temperatures of elements, components, devices, and interconnects (collectively "instances") are updated based on a 3D full chip temperature analysis, optionally using spatial- and/or time-varying analysis grids. Respective power dissipations of the instances are updated, as a function of the temperatures, with an automated interface to one or more circuit simulation tools. In some embodiments the power update is via one or more temperature-power look up tables. Subsequently new temperatures are determined as a function of the power dissipations. User definable control and observation parameters enable flexible and efficient transient thermal analysis. The parameters include one or more of: waveforms for power sources, temperature limits for automatic monitoring and reporting of violations, tolerance limits for optimized time step control, resolution of time points for output snapshots, and initial power value states. Viewing of waveform plots and 3D spatial variations of temperature (as a function of time) enable efficient communication of results of the thermal analysis with designers of integrated circuits.

Transient thermal simulation enables accurate modeling of temperature transients. In some usage scenarios, detecting and/or characterizing temperature transients enables reduction and/or elimination of particular deleterious effects. The deleterious effects include performance degradation and malfunctions cased by device self-heating, as well as electromigration and reliability reduction caused by Joule (e.g. interconnect) heating. The deleterious effects further include parametric failures caused by unexpected and/or unplanned temperature differences across circuits, in addition to peak instantaneous temperatures exceeding tolerance thresholds caused by duty cycle of a power waveform of an instance (e.g. an element, component, device, and/or interconnect). The deleterious effects also include deviation from expected electrical behavior (e.g. signal timing, power drive, and signal waveform shape) caused by electrical response time comparable to a temperature time constant.

In some usage scenarios, integrated circuit designs result in integration of power transistors within high performance mixed-signal designs (e.g. designs combining digital and analog elements, components, or devices). In some usage scenarios, in view of increased power densities caused by the integration, temperature variations within the chip are taken into account to achieve cost effective and reliable chip designs. Integrated circuit and system designers consider potential temperature hazards in integrated circuit designs via analyses combining electrical and thermal simulations. Multi-dimensional (such as two- and three-dimensional) thermal analysis of integrated circuit designs are performed to evaluate temperature gradients over time, in part to determine existence of temperature risks or vulnerabilities.

In some integrated circuit design flows, a temperature-aware analysis technique provides detailed temperature information for design improvements of chip designs, such as mixed-signal chip designs. In some usage scenarios, a thermal analysis is used in conjunction with an electrical circuit simulation (such as Cadence Spectre) to provide a temperature-aware integrated circuit design flow. Multi-dimensional (such as two- or three-dimensional) temperature distributions are calculated for an integrated circuit and visualized, examined, and/or analyzed early in a design cycle (e.g. before taping out). Checking temperature is useful, in some usage scenarios, for predicting potential temperature hazards under steady state and/or transient temperature conditions.

In some integrated circuit design flows, layout and netlist data available in a physical design environment (such as a design environment from Cadence), is used in an automated flow that annotates instance-specific temperatures determined via a thermal simulator to an electrical simulator (such as Cadence Spectre) to obtain temperature-aware power from the electrical simulator. The resulting temperature information is used for floorplanning, area management, locating high-density power circuitry, and other design functions to reduce design guard bands and potential circuit malfunctions.

In some embodiments, transient thermal analysis is via relaxation simulation with separate but synchronized thermal and electrical simulations, enabling accurate and scalable performance Decoupling thermal and electrical simulations enables efficiencies in performance and memory usage. Optionally, a plurality of electrical simulators are used. In some usage scenarios, mixed level circuit descriptions (e.g. digital and/or analog blocks, transistor circuits, and architectural level descriptions) are processed by the simulators, enabling evaluation of behavior, including transient thermal effects, prior to final layout and/or prototype production.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method including:
 determining power dissipations of devices and interconnects of an integrated circuit; and
 determining temperatures of the devices and the interconnects in accordance with the power dissipations; and
 wherein the determining power dissipations is in accordance with the temperatures.

EC2) The method of EC1 further including repeating the determining power dissipations and the determining temperatures until a specified termination condition is met.

EC3) The method of EC1 wherein the determining power dissipations is iterative.

EC4) The method of EC1 wherein the determining temperatures is iterative.

EC5) The method of EC1 wherein the determining temperatures is in accordance with a spatially-varying grid.

EC6) The method of EC1 wherein the determining temperatures is in accordance with a time-varying grid.

EC7) The method of EC1 wherein the determining power dissipations and the determining temperatures are repeated to model transient electrical behavior of the integrated circuit.

EC8) The method of EC1 wherein the determining power dissipations and the determining temperatures are repeated to model transient thermal behavior of the integrated circuit.

EC9) A method including:
 defining initial temperature conditions;
 defining an initial time step;
 determining a power distribution based on the initial temperature conditions;
 formulating an analysis grid based on the power distribution, the formulating optionally including adjusting spatial characteristics of the analysis grid;
 computing a trial temperature distribution in accordance with the power distribution;
 determining an error bound associated with the trial temperature distribution;
 if the error bound is greater than an error threshold, then decreasing a time step; and
 wherein the spatial characteristics include spacing of the analysis grid.

EC10) A method including:
 determining average power dissipation of an integrated circuit;
 determining an average temperature based on the average power dissipation and thermal resistance of a package of the integrated circuit;
 determining thermal capacitance of a die of the integrated circuit based on material properties of the die;
 determining thermal resistance of one or more elements of the die based on the material properties;
 determining a thermal RC network based at least on the thermal capacitance, the thermal resistances, and dimensions of one or more sections of the die; and
 determining a temperature distribution in space and time across the RC network based on power waveforms acting as driving functions to the RC network.

EC11) The method of EC10 wherein the average power dissipation is a function of duty cycle of a power source.

EC12) The method of EC10 wherein the average power dissipation is a function of pulse height of a power source.

EC13) The method of EC10 wherein the elements include power devices.

EC14) The method of EC13 wherein the elements further include neighbors of the power devices.

EC15) The method of EC10 wherein the material properties include one or more of a dimension, mass density, specific heat, and thermal conductivity.

EC16) The method of EC10 further including determining a temperature distribution of the package.

EC17) The method of EC10 further including determining a temperature distribution of pads of the integrated circuit.

EC18) The method of EC10 further including determining a temperature distribution of a printed circuit board the integrated circuit is mounted on.

EC19) The method of EC10 wherein the temperature distribution is a die temperature distribution and further including determining a package temperature distribution of the package.

EC20) The method of EC19 further including superimposing the die and the package temperature distributions to determine one or more maximum temperatures as a function of time.

EC21) A method including:
 determining one or more power samples by sampling one or more power waveforms at a current time interval;
 determining heat propagation for the current time interval between power source locations of a die of an integrated circuit and points of the die as a function of the power samples; and
 repeating the determining power samples and the determining heat propagation at a next time interval that is later in time than the current time interval.

EC22) The method of EC21 wherein the determining heat propagation is via a steady state temperature calculation mechanism.

EC23) A computer readable medium having a set of instructions stored therein that when executed by a processing element causes the processing element to perform functions including any of the foregoing methods.

EC24) A system including:
 a processing element; and
 a memory;
 wherein the memory stores instructions therein that when executed by the processing element cause the processing element to perform functions including any of the foregoing methods.

EC25) A system including:
  means for performing functions including any of the foregoing methods.

Transient Thermal Analysis

FIG. 1 illustrates a conceptual view of an embodiment of a transient thermal analysis of a semiconductor chip. Power information (such as power dissipation in regions/devices/interconnects of the chip, power distribution as a function of two or more dimensions of the chip, and other power-related electrical simulation results) is computed by an electrical simulator (Compute Power 101). The power computation is based on temperature annotated to each region, device, and/or interconnect. In a first iteration, initial temperatures are assumed. The power information is then conveyed to and used by a thermal simulator (Compute Temperatures 102) to compute temperature information, such as temperatures in the regions, devices, and interconnects, as well as temperature distribution as a function of two or more dimensions of the chip, and other temperature-related thermal simulation results. The temperature information is then used by the electrical simulator to compute updated power information in a next time step. Iteration continues until a simulation interval is complete. In the figure, Temperature Information 103 illustrates flow of computed temperatures from the thermal simulator to the electrical simulator. Power Information 104 illustrates flow of computed power from the electrical simulator to the thermal simulator.

Figure 2:
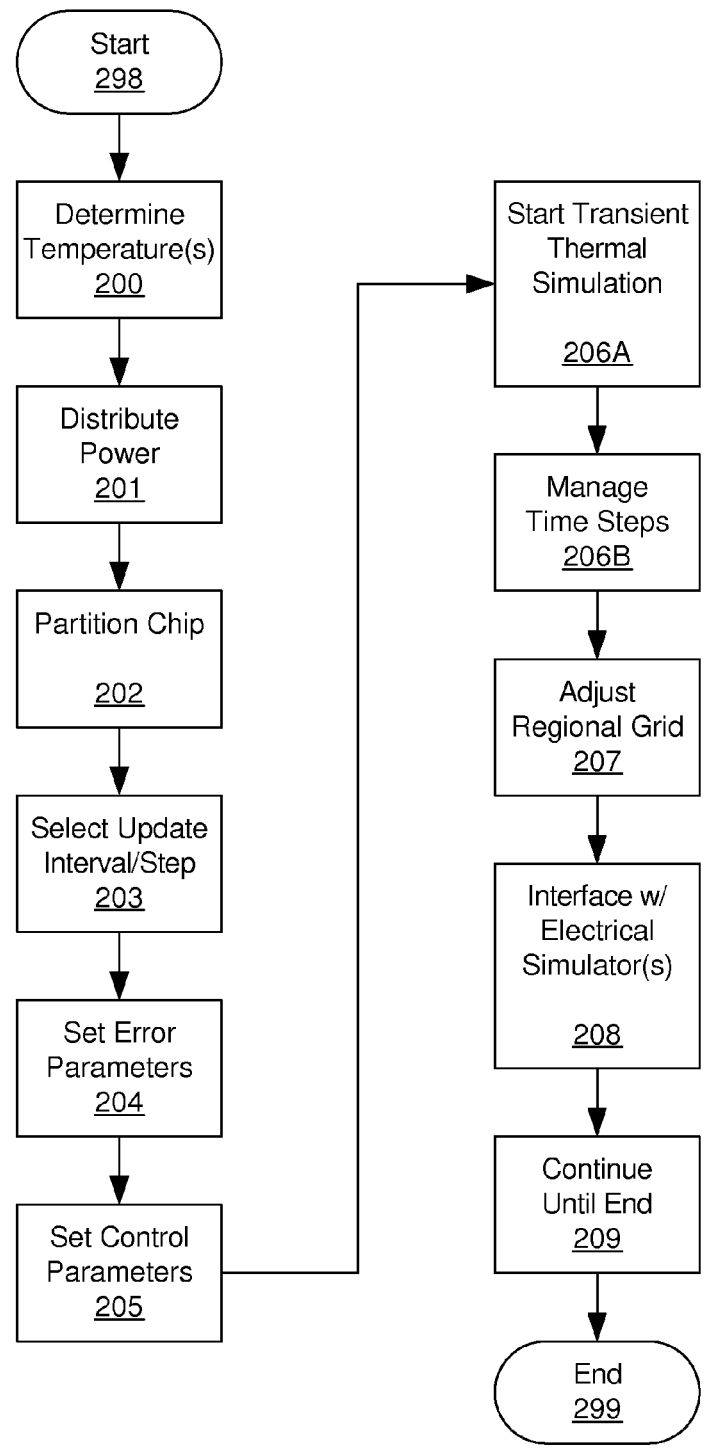
FIG. 2 illustrates selected details of an embodiment of a transient thermal analysis.

FIG. 2 illustrates selected details of an embodiment of a transient thermal analysis, in a context of an event driven electro thermal analysis of an integrated circuit, such as a semiconductor chip.

Start 298: Begin processing for a simulation interval.

Determine Temperature(s) 200: Compute and/or assign initial temperatures to regions or instances (e.g. elements, components, devices, and interconnects) of the chip. Some embodiments use a same temperature throughout the chip, while other embodiments use respective temperatures for associated respective regions or instances of the chip.

Distribute Power 201: Determine and/or compute chip power throughout the chip using the initial temperature(s) as a startup state.

Partition Chip 202: Identify and define separate multidimensional (2D or 3D) regions of the chip based on one or more of: power distribution, geometry, various design-specific characteristics, and/or various operating-point specific characteristics.

Select Update Interval/Step 203: Determine and/or assign a simulation time interval and time_step_for_electrothermal_update that at least in part determines when thermal simulation and electrical simulation interact.

Set Error Parameters 204: Assign, compute, and/or determine error parameters globally or per region (such as first order and up to n order error(s) based on desired resolution for time interval and spatial grids).

Set Control Parameters 205: Assign, compute, and/or determine control parameters globally or per region for a transient thermal solution. The control parameters are one or more of:
  initial_time_step
  minimum_time_step
  maximum_time_step
  step_reduction_factor (decrease in time_step when error is too large)
  step_relaxation_factor (increase in time_step when error bound is too large)
  time_step_for_electrothermal_update
  snapshot_temperature_change (delta-T-based user-desired reporting event)
  snapshot_time_interval (time-based user-desired reporting event)
  snapshot_step_interval (interval to capture simulation output, corresponding to a specified number of steps)
  critical_temperature_change (e.g., an assertion defining a reporting event, whereas the snapshot conditions define points at which output is stored)
  single_point_temperature_bounds (e.g., an assertion defining design violation criteria due to a single point being above/below a threshold)
  multiple_point_temperature_difference_bounds (e.g., an assertion defining design violation criteria due to temperature differences between two or more points being above/below a threshold)
  Note that some control parameters are specified as a single instance (such as initial_time_step), and some control parameters are specifiable as a plurality of instances (such as single_point_temperature_bounds to monitor more than one point, or multiple_point_temperature_difference_bounds to monitor temperature differences within more than one group of points)

Start Transient Thermal Simulation 206A: Initiate and/or begin transient thermal simulation.

Manage Time Steps 206B: Compute and/or (re)compute time steps to efficiently maintain accurate simulation results. For example, based on one or more parameters such as maximum and/or minimum error bounds, increase or decrease a time step.

Adjust Regional Grid 207: Use time of event to adjust regional grid based on temperature.

Interface with Electrical Simulator(s) 208: At a simulation time defined by time_step_for_electrothermal_update, interface with one or more electrical simulator(s) to distribute chip power for each region or instance and adjust the grid per region or instance. In some embodiments, processing associated with Interface with Electrical Simulator(s) 208 is similar to processing associated with Distribute Power 201.

Continue Until End 209: Processing is ongoing until the end of the simulation interval is reached.

End 299: Processing relating to the simulation interval is complete. In some embodiments and/or usage scenarios, processing is then directed to continue for a next simulation interval, beginning with Start 298.

Note that in some embodiments and/or usage scenarios, reporting includes any combination of storing and capturing simulation state and/or output, such as for subsequent inspection by a designer and/or processing by one or more design analysis tools.

Transient Thermal Analysis Techniques

Various embodiments of transient thermal analysis of a semiconductor chip use one or more of the following types of techniques:

In selective power updating techniques, power is updated selectively based on temperature. Power updates for a particular region are omitted unless temperature(s) of the particular region change more than a threshold amount. The threshold amount is defined by user parameters related to a time grid analogous to a spatial grid used for analysis.

In separate matrix computation/evaluation techniques, computation of a matrix (e.g. to determine values of the matrix) used to solve heat equations is separate from evaluation of the matrix (e.g. to determine temperatures). In some embodiments, separate matrix computation and evaluation are performed with respect to spatially distinct regions of analysis, and optionally one or more of the regions are treated independently from each other (aside from processing of boundary conditions for spatially adjacent regions). In some embodiments, the matrix (or one or more portions thereof corresponding to one or more regions) is recomputed in response to one or more conditions (or one or more changes thereto) that indicate a need for re-computation to maintain simulation accuracy. Example conditions monitored to determine when to re-compute the matrix include error bounds, assertions, temperature change(s) (e.g. indicating a need for reevaluation of the matrix), and other factors affecting thermal simulation. For instance, the matrix is recomputed whenever there is a change in time step. In some embodiments, only portions of the matrix subject to re-computation based on the monitored conditions are re-computed, and other portions of the matrix are not re-computed. Computation and re-computation of the matrix is performed via a variety of mechanisms, according to various embodiments. The mechanisms include direct matrix computation, iterative matrix computation, evaluation based on a single grid throughout all regions, evaluation based on one or more respective grids per region, and evaluation based on multi-grid schemes.

In time/space grid techniques, analysis is according to a "grid" in both time and space. At each time step, a spatial grid in a given region is selectively coarsened (e.g. relaxed) or refined (e.g. reduced) based on local conditions (e.g., gradients, error bounds, and other criteria). At each time step, a temporal grid (indicating new time steps) in each region is optionally coarsened or refined based on error bounds (and optionally on gradients).

In assertion controlled techniques, grid-based analysis is controlled based on or in accordance with assertions (such as functions based on time). When an assertion (e.g., max temperature difference) is triggered, a grid is adjusted (e.g., refined according to temperature values) to enable determining more accurate data. Power updates at time points defined by parameters result in coarsening or refining of the grid based on power distribution. In some usage scenarios, the coarsening or the refining provides a way of adjusting the grid "instantly" and is useful as a predictor of a future temperature profile, and is optionally used to seed the grid, thus preparing the grid for a more accurate temperature calculation. In response to temperature changes that trigger a critical event parameter, the grid is adjusted (via coarsening or refining) based on temperatures resulting from a previous power update, providing increased accuracy in some usage scenarios.

In time rewinding techniques, when an assertion (such as exceeding a critical temperature) is triggered, an analysis is turned "backward" in time by adjusting grid and/or time step and repeating from a point previous to the triggering. Additional and/or more accurate data is collected relating to the triggered assertion. The repeating from a previous time is dependent on when the last time the electrical simulation results were saved (such as in a snapshot). For example, scanning the electrical simulation (such as from the initial temperature), the time points of power surges and changes in the power profile are used for predicting when snapshots of electrical simulation results are to be saved during thermal simulation.

Transient Thermal Analysis Embodiment

Figure 3:
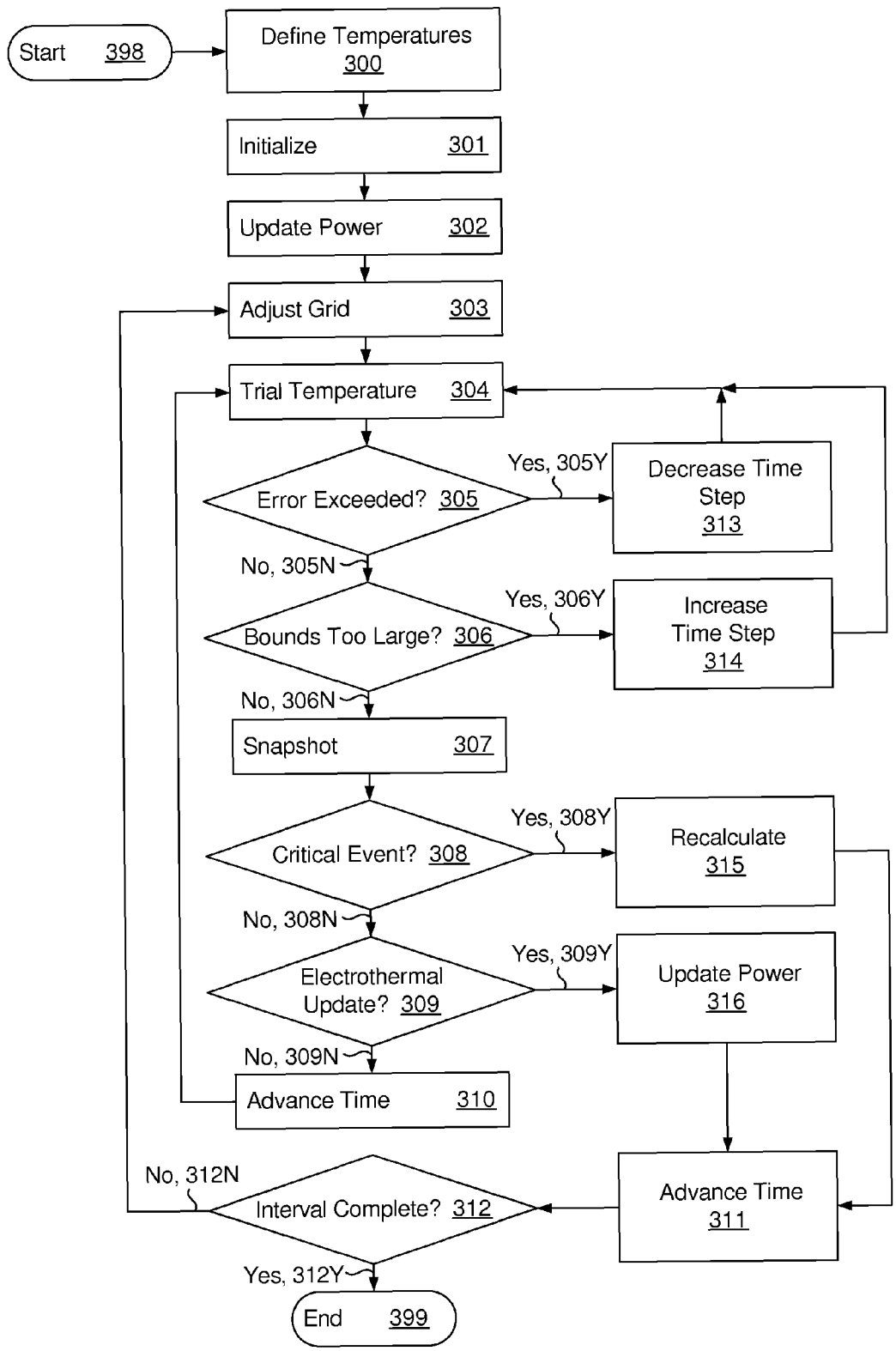
FIG. 3 illustrates selected details of an embodiment of a transient thermal analysis of a region of a semiconductor chip.

FIG. 3 illustrates selected details of an embodiment of a transient thermal analysis of a region of a semiconductor chip. The parameters snapshot_time_interval and snapshot_step_interval provide two distinct ways of controlling the resolution of the output. In response to snapshot_time_interval, the transient thermal analysis provides and/or outputs results in accordance with the specified time interval(s). In response to snapshot_step_interval, the transient thermal analysis provides and/or outputs results after each passage of the specified number of steps.

The minimum_time_step enables accuracy versus run time tradeoffs. A setting equal to a minimum time of interest reduces run time by preventing the simulator from taking time steps that are unnecessarily small or too fine. The maximum_time_step further enables accuracy versus run time tradeoffs. A setting equal to a maximum time granularity increases accuracy by preventing the simulator from taking time steps that are too large or too coarse. The time step bounds (minimum_time_step and maximum_time_step) are checked during adjustment of the time steps.

Time interval h represents the time increment (e.g. incremental time step, referred to as time_step or "time step" elsewhere herein) within the simulator.

Various embodiments use any of several integration schemes to solve the time dependent heat equation:

$$(1/\alpha)\partial T/\partial t = \partial 2T/\partial x2 + \partial 2T/\partial y2 + \partial 2T/\partial z2 + q'$$

in the Cartesian coordinate system, where $\alpha$ is material thermal diffusivity and q' is the rate of energy generation per unit volume. Any of several integration schemes are usable to solve the heat equation. For example:

$$Tn+1 = Tn + 0.5*h*[T'n + T'n+1]$$

where Tn is temperature at time step n and T' is the derivative of T with respect to time t. The notation T (t) represents temperature at time t.

For every time interval h, a solver estimates first order error and second order error. An example of the first order error is a temperature change between the beginning and the end of the interval. An example of the second order error is an error contribution relating to derivatives of temperature terms over the interval. The time interval h is adjusted if the temperature (or change thereof) exceeds specified tolerance limits. For example, if error bounds are exceeded, then h is decreased by step_reduction_factor. If error bounds are too large, then h is increased by step_relaxation factor.

A system of equations is thus formulated for the internal grid points with the finite difference scheme as one example for approximating a solution to the system. FIG. 3 illustrates an iterative numerical scheme, where between time steps the value of $\alpha$ (alpha) is held constant. Holding $\alpha$ constant reduces the system to a linear form. In other embodiments $\alpha$ varies between time steps. Some alternate embodiments use other numerical techniques to solve the differential equations in accordance with the foregoing concepts of grid modification in response to events triggered by temperature and power updates.

More specifically, FIG. 3 illustrates the following operations and processes.

Start 398: Begin processing for a simulation interval.

Define Temperatures 300: Compute and/or assign initial temperature conditions.

Initialize 301: Assign h=initial_time_step.

Update Power 302: Determine, compute, and/or calculate power based on temperature at initial time $t=t_0$, via, for example, an electrical simulator.

Adjust Grid 303: Modify, recompute, and/or recalculate all or any portion of the grid based on power distribution (e.g. coarsen or refine the grid).

Trial Temperature 304: Try t=t+h and attempt to compute temperature T(t).

Error Exceeded? 305: Determine if error is greater than an upper threshold. If so, then processing continues to Decrease Time Step 313 (Yes, 305Y) to reduce the error by reducing the time step. If not, then processing continues to Bound Too Large? 306 (No, 305N).

Bound Too Large? 306: Determine if too much error is being allocated. If so, then processing continues to Increase Time Step 314 (Yes, 306Y) to increase the time step (to improve simulation efficiency). If not, then processing continues to Snapshot 307 (No, 306N).

Snapshot 307: Determine if criteria for generation and/or output of a snapshot has been met. If so, then create a corresponding snapshot.

Critical Event? 308: Determine if an important temperature change has occurred. If so, then processing continues to Recalculate 315 (Yes, 308Y) to reset simulation state to a state from a previous one of the snapshots. If not, then processing continues to Electrothermal Update? 309 (No, 308N).

Electrothermal Update? 309: Determine if the current time step is a time step to use temperature information to update power. If so, then processing continues to Update Power 316 (Yes, 309Y) to update power. If not, then processing continues to Advance Time 310 (No, 309N).

Advance Time 310: Increment the current simulation time forward by a time step (e.g. t=t+h). Processing then loops back to Trial Temperature 304 to continue processing for the simulation interval.

Decrease Time Step 313: Determine a reduced time step (e.g. new_h=h−step_reduction_factor) to improve accuracy and/or decrease error. Reset and/or restore temperature values to values before advancing time, and then update the matrix. Processing then loops back to Trial Temperature 304 to continue processing for the simulation interval.

Increase Time Step 314: Determine an increased time step (e.g. new_h=h+step_relaxation_factor) to improve simulation accuracy (albeit with decreased accuracy and/or increased error). Update the matrix and generate and/or output snapshot values appropriately. Processing then loops back to Trial Temperature 304 to continue processing for the simulation interval.

Recalculate 315: Set $t_{start}$ to a prior snapshot to $t_{event}$. Generate an analysis grid based on temperature and/or distributions thereof. Integrate the interval $t_{event}$ to $t_{start}$ using electrical simulation state from $t_{start}$.

Advance Time 311: Increment the current simulation time forward by a time step (e.g. t=t+h).

Interval Complete? 312: Determine if the processing for the simulation interval is complete. If so, then processing is complete (Yes, 312Y) at End 399. If not, then processing loops back (No, 312N) to Adjust Grid 303 to continue processing for the simulation interval.

Update Power 316: Similar to Update Power 302, determine, compute, and/or calculate power based on temperatures at the current time, and output snapshot values appropriately. Processing then continues to Advance Time 311.

End 399: Processing is complete.

Alternative Transient Thermal Analysis Techniques

In some usage scenarios and/or embodiments, one or more of the foregoing processes, functions, and/or techniques are replaced, enhanced, modified, and/or supplemented by all or portions of one or more of the following alternative transient thermal analysis techniques. In some instances, the alternative techniques provide analysis results using less computational resources than the foregoing processes, functions, and/or techniques, potentially sacrificing accuracy to use less resources.

Figure 4:
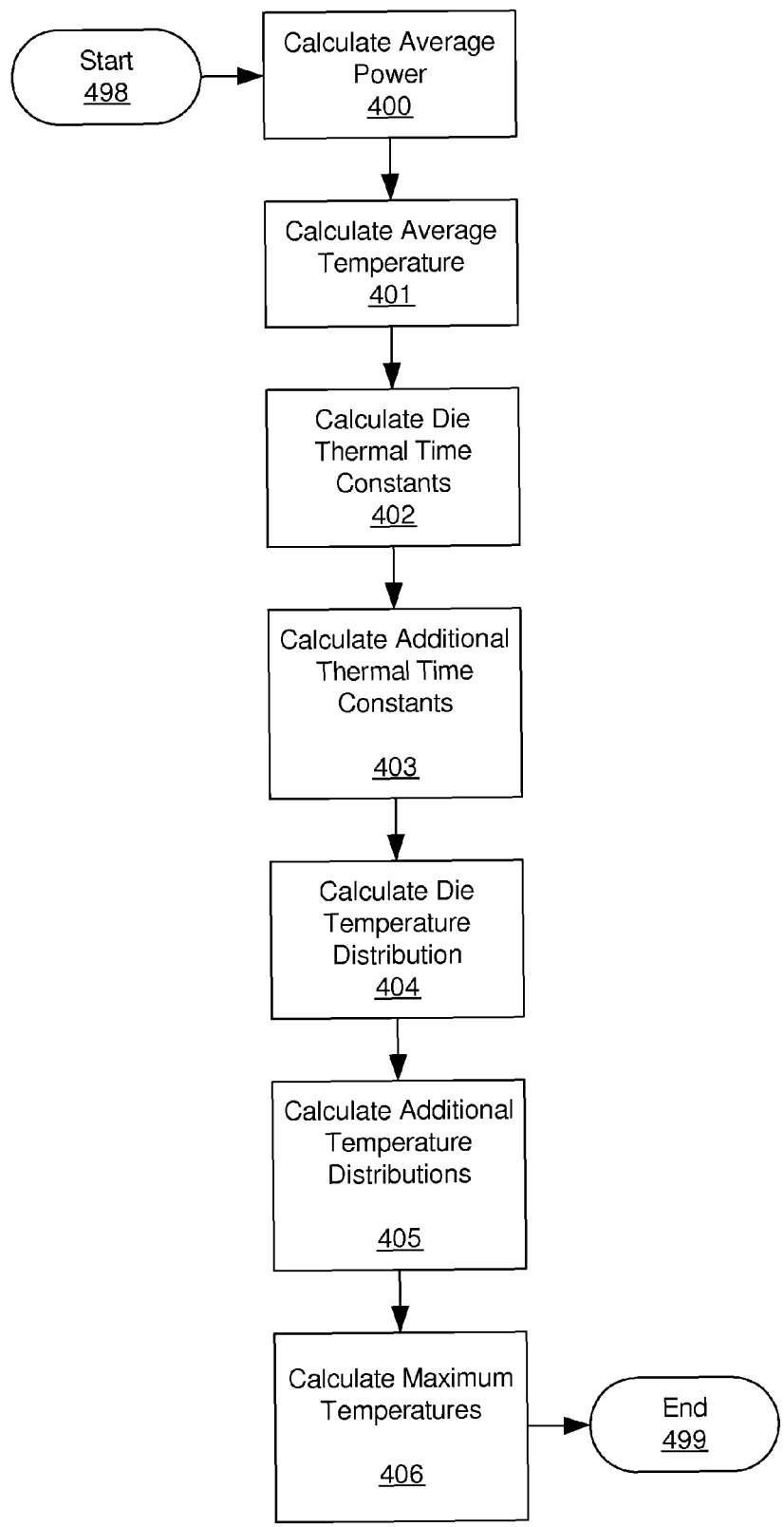
FIG. 4 illustrates selected details of a first alternative transient thermal analysis technique.

FIG. 4 illustrates selected details of a first alternative transient thermal analysis technique. In the first alternative technique, thermal time constants of a system and/or duty cycle of power source(s) are calculated to determine temperature distribution over space and time within a chip constructed of a package and a die. The calculations are performed manually (e.g. by an engineer), performed automatically (e.g. by software), or both. For example, as illustrated in the figure:

Start 498: Begin processing.

Calculate Average Power 400: Determine and/or compute average power based on duty cycle and pulse height of one or more power sources.

Calculate Average Temperature 401: Determine and/or compute average temperature as thermal resistance of the package multiplied by the average power.

Calculate Die Thermal Time Constants 402: Determine and/or compute thermal capacitance of the die based on various material properties of the die (such as dimensions, mass density, specific heat, and thermal conductivity). Determine and/or compute thermal resistances of instances of the die (e.g. elements, components, devices, and interconnects such as power devices, neighbor devices of the power devices, and intermediate points) based on the material properties. Determine and/or compute thermal time constants as a thermal RC network that is constructed for the die. For example, thermal resistance of a section of the die is computed as length of the section divided by the multiplication of the thermal conductivity with cross section area of the section. Volumetric thermal capacitance is computed as the specific heat multiplied by the mass density. The thermal RC network is thus calculated based on dimensions of sections and the material properties.

Calculate Additional Thermal Time Constants 403: Optionally repeat processing as described for the die in Calculate Die Thermal Time Constants 402, substituting one or more of: the package, pads, and a printed circuit board (for mounting the chip) in the processing, using dimensions and material properties of the package, the pads, and the printed circuit board respectively.

Calculate Die Temperature Distribution 404: Determine and/or compute a temperature distribution in space and time (e.g. a temperature waveform) across the RC network (for example at the power and the neighbor devices) based on power waveforms (e.g. rates of energy dissipation) acting as driving functions. Conceptually the thermal network is "solved" to produce the temperature distribution.

Calculate Additional Temperature Distributions 405: Optionally determine and/or compute temperature waveforms of one or more of: the package, the pads, and the printed circuit board based on lumped models of one or more RC networks determined by operations described in Calculate Additional Thermal Time Constants 403.

Calculate Maximum Temperatures 406: Optionally determine and/or compute temperature sum waveforms by superimposing the temperature waveforms calculated by Calculate Die Temperature Distribution 404 and Calculate Additional Temperature Distributions 405, to calculate maximum temperatures on the chip as a function of time. The maximum temperatures are analyzed with respect to average temperatures and times of application of power from various power sources to calculate temperature differences (e.g. gradients) between points of the chip.

End 499: Processing is complete.

The foregoing alternative technique is extendible to arbitrary power waveforms by sampling the power waveforms in time at small intervals, and applying the foregoing alternative technique iteratively to contexts corresponding to each of the samples.

Figure 5:
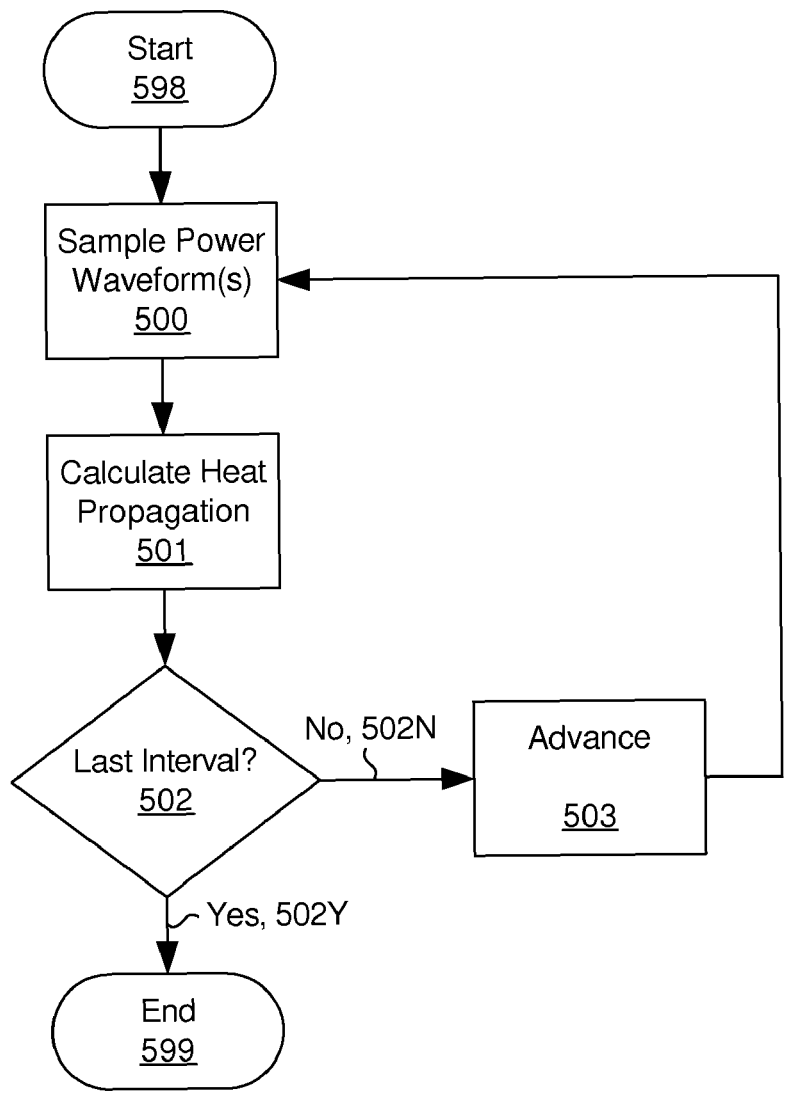
FIG. 5 illustrates selected details of a second alternative transient thermal analysis technique.

FIG. 5 illustrates selected details of a second alternative transient thermal analysis technique. In the second alternative technique, heat diffusion (such as within a die) is approximated by closed-form equations. A distance L that heat travels in an interval of time t is expressed as a closed-form equation:

$$L=\mathrm{sqrt}(\mathrm{alpha}*t);$$

where alpha is equal to thermal diffusivity (a function of various material properties such as conductivity, density, and specific heat). Heat propagation for a given time interval that temperature is distributed over is calculated between power source locations and points within the die by a steady state temperature calculation mechanism (such as a software tool). Conceptually, heat propagation over a period of time is calculated by sampling power waveforms at discrete times during the period, and using the samples as input to a steady state temperature calculation mechanism (such as the aforementioned closed-form equation) to calculate new temperatures. The sampling and the calculating are repeated for advancing time intervals until the period is completely analyzed. Repeating the heat propagation calculation over time enables calculation of a temperature profile over time for various points of the die (or a chip). Thus temperature calculations are repeated at discrete time points (such as predetermined from the chip geometry, the material properties, or both). In some embodiments, discrete time intervals are defined based on time of propagation, avoiding direct use of thermal RC time constants. A subsequent discrete time point DC simulation determines space and time distribution of temperature.

An example is illustrated in FIG. 5, where a transient thermal analysis is performed for a specified length of time, using closed-form approximation(s) to heat diffusion. The length of time is broken into a sequence of contiguous time intervals analyzed each in turn as a current time interval.

Start 598: Begin processing at a starting time interval by setting the current time interval to the starting time interval.

Sample Power Waveform(s) 500: Determine and/or compute values of power source(s) at a discrete point in time corresponding to the current time interval.

Calculate Heat Propagation 501: Determine and/or compute heat propagation based on the sampled power waveform(s), using, for example, the aforementioned closed-form equation for distance that heat travels in an interval of time, where the interval of time corresponds to the current time interval. Other closed-form equations, expressions, and/or solution techniques are used in other embodiments.

Last Interval? 502: Determine if the specified length of time has been processed. If so, then processing is complete (Yes, 502Y). If not, then additional time intervals are processed (No, 502N).

Advance 503: Set processing to a next time interval by advancing the current time interval, and loop back to repeat processing for the next time interval (Sample Power Waveform(s) 500).

End 599: Processing is complete for the specified length of time.

Transient Thermal Analysis Usage Scenarios

In some usage scenarios, transient thermal analysis enables recognition of thermal effects that would otherwise be undetected, or detected only after producing prototypes of a design. Duty cycles of power sources affect rates of heat dissipation. Several thermal time constants determine transient thermal behavior, such as individual device temperature peaks (on the order of hundreds of microseconds), whole-die thermal response (on the order of milliseconds), and integrated circuit package and die/substrate thermal response (on the order of seconds). In some circumstances, accumulated heat causes instantaneous peak junction temperature to be much higher than steady state values. Thermal transient analysis enables identifying hot spot spatial locations and thermal magnitudes as a function of time, enabling detection of circumstances that would otherwise result in problems with circuit performance, reduced reliability, and/or failure (such as burn out).

For example, consider a mixed signal design having switching high power driver(s), such as used in smart power chips, automotive applications, or high-speed communication systems. Power source performance is affected by relatively slower time varying transient temperatures that are readily detectable via transient thermal analysis. For another example, switching power sources in a mixed signal design affect device and/or die temperatures, resulting in maximum device and/or die temperatures exceeding respective maximum values. Permanent damage occurs, under some conditions, even when a maximum temperature is exceeded only momentarily. Transient thermal analysis enables accurate determination of if a maximum temperature is exceeded, and if so, where on a device or die, and under what conditions. For another example, a mixed signal design requires a reliable power drive capability for a safety critical application. High temperatures momentarily reduce power drive, resulting in possible malfunction(s). Transient thermal analysis enables accurate determination of locally momentary temperature maximums. Various techniques of integration of analog, digital, and mixed signals systems and systems-in-package result in dense power distributions. Transient thermal analysis enables detection of otherwise undetectable (or difficult to detect) transitory failure conditions caused by high temperature distributions associated with the dense power distributions.

Figure 6:
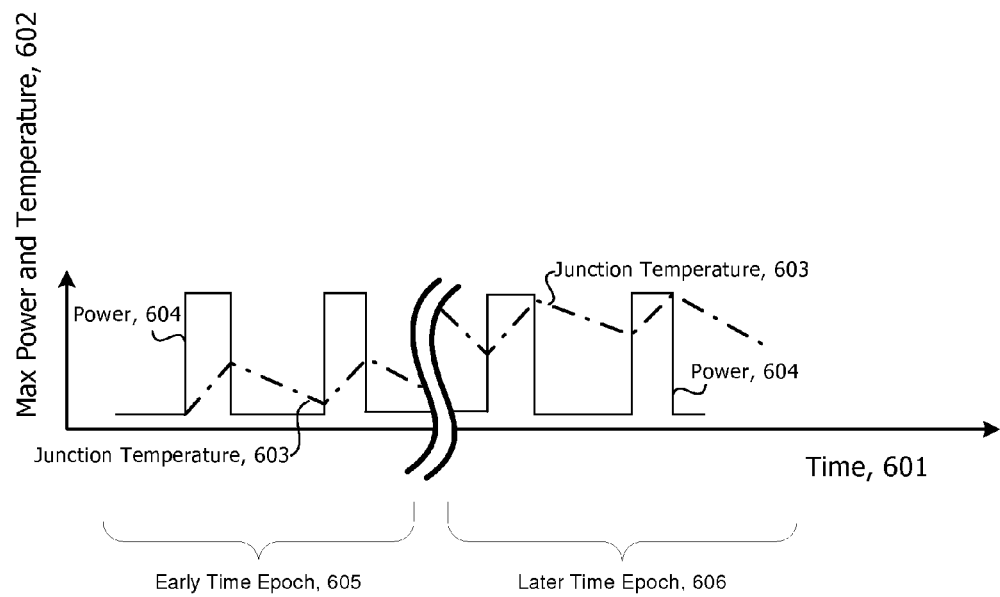
FIG. 6 illustrates an example of junction temperature as a function of time, determined via transient thermal simulation, in a context having a pulsed power source.

FIG. 6 illustrates an example of junction temperature (Junction Temperature 603) as a function of time, determined via transient thermal simulation, in a context having a pulsed power source (Power 604). The X-axis is Time 601 and the Y-axis is Max Power and Temperature 602. At a relatively early time (Early Time Epoch 605) insufficient time has elapsed for accumulated heat to build up, and the local peaks of the junction temperature are relatively low. At a relatively later time (Later Time Epoch 606) sufficient time has elapsed for heat to build up, and the local peaks of the junction temperature are relatively high. Transient thermal analysis enables modeling and prediction of thermal behaviors, such as the accumulated heat built up as indicated in the late time epoch with respect to the early time epoch.

Figure 7:
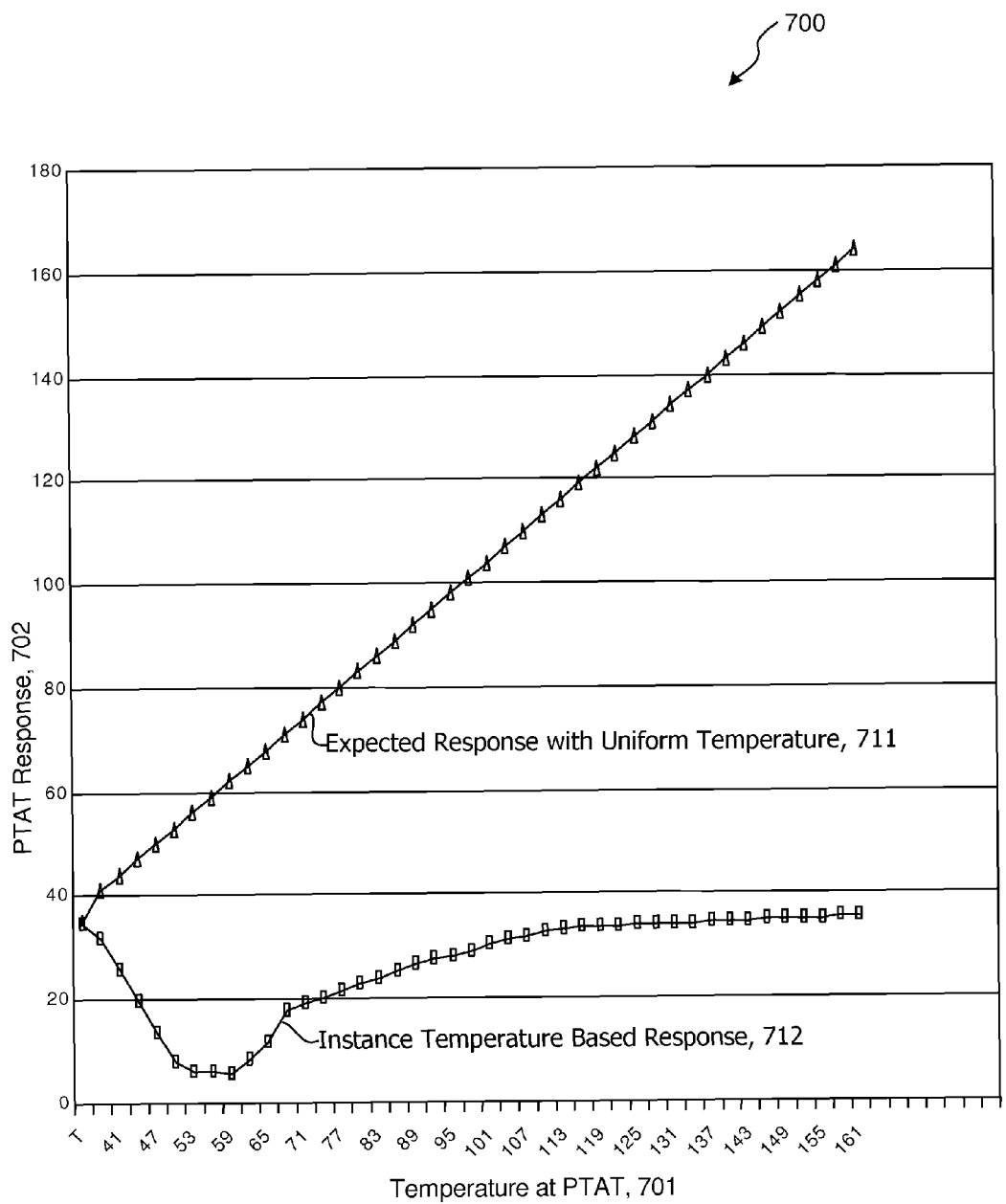
FIG. 7 illustrates an example PTAT response with transient temperatures, as determined via transient thermal analysis, versus uniform temperatures.

FIG. 7 illustrates Example PTAT Response 700 with transient temperatures (Instance Temperature Based Response 712), as determined via a transient thermal analysis, versus uniform temperatures (Expected Response with Uniform Temperature 711). The X-axis is Temperature at PTAT 701 and the Y-axis is PTAT Response 702. The figure illustrates how electrical response is affected by temperature, and how transient temperature effects are different than steady state (e.g. uniform) temperature effects. In some usage scenarios, relatively fast digital switching power sources are affected more by average temperature rather than instantaneous temperatures. In some usage scenarios, transition time of power transistors is comparable with a rate of temperature response on a die or portion thereof, and effects on the transition time are readily modeled by using transient thermal analysis in conjunction with electrical response modeling (e.g. circuit simulation).

Figure 8:
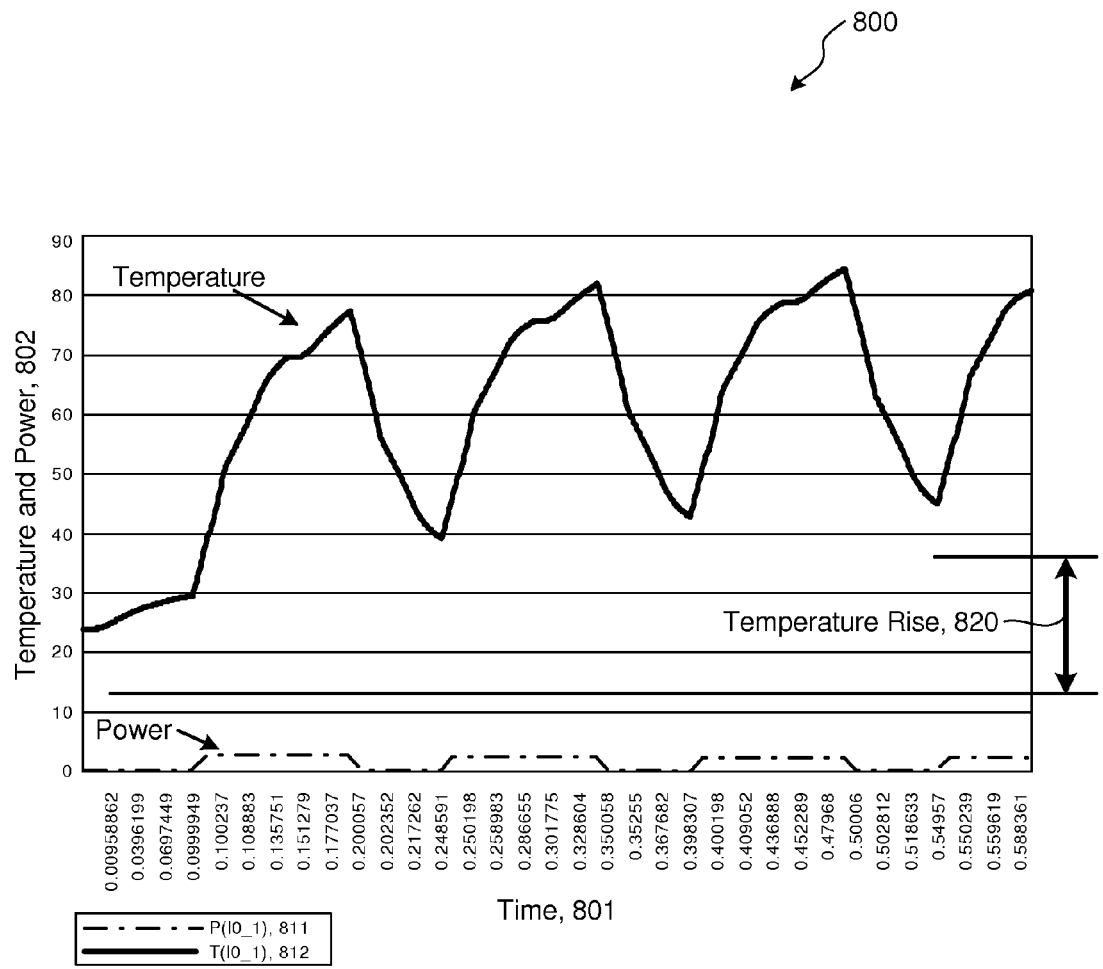
FIG. 8 illustrates an example transient temperature waveform, as determined by transient thermal analysis, at a single location on a die, in a context having a single transistor power source.

FIG. 8 illustrates Example Transient Temperature Waveform 800, as determined by transient thermal analysis, at a single location on a die, in a context having a single transistor power source. The X-axis is Time 801 and the Y-axis is Temperature and Power 802. There is a power waveform, illustrated as P(I0_1) 811, representing, for example, power at a particular instance of an element, component, device, or interconnect, such as an IO pad or interface circuitry. There is a temperature waveform, illustrated as T(I0_1) 812, representing, for example, temperature at the instance, while operating as illustrated by P(I0_1) 811. Temperature Rise 820 conceptually illustrates how temperature increases over time due to the thermal time constant of the die.

Figure 9:
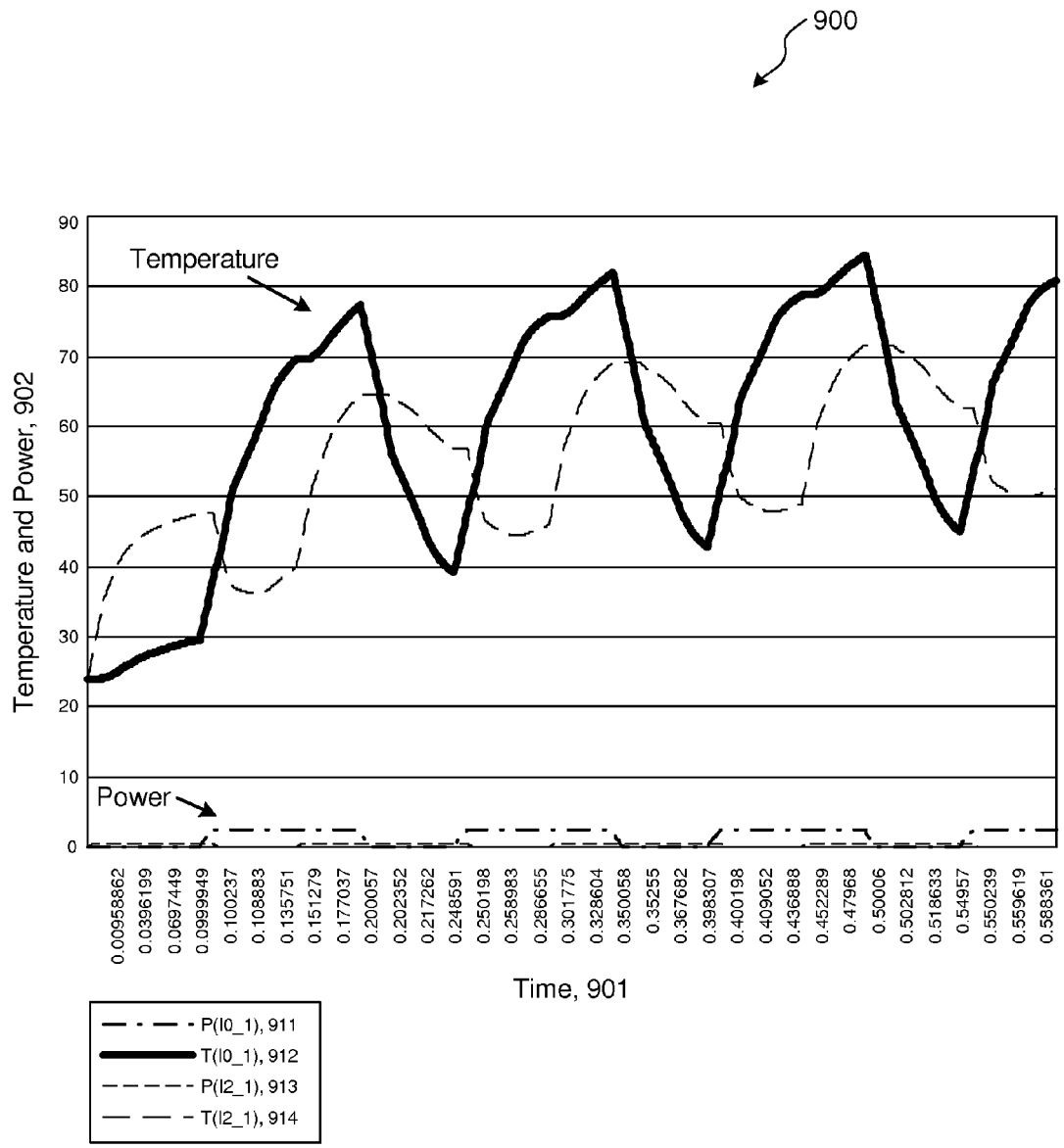
FIG. 9 illustrates example temperature waveforms, as determined by transient thermal analysis, at different locations on a die, in a context having two transistor power sources.

FIG. 9 illustrates Example Temperature Waveforms 900, as determined by transient thermal analysis, at different locations on a die, in a context having two transistor power sources. The X-axis is Time 901 and the Y-axis is Temperature and Power 902. There are two power waveforms corresponding to each of two instances, P(I0_1) 911 and P(I2_1) 913, and respective temperature waveforms T(I0_1) 912 and T(I2_1) 914, of the two instances while operating according to the respective power waveforms.

In some usage scenarios, transient thermal analysis produces waveforms that provide spatial temperature distribution information as a function of time for use by integrated circuit designers and/or engineers. In various embodiments of transient thermal analysis, monitoring capabilities include monitoring one or more of: temperature limits of individual power sources, temperature differences between multiple power sources, temperature differences across power sources, and temperature variations at particular locations within a chip.

Computer System

Figure 10:
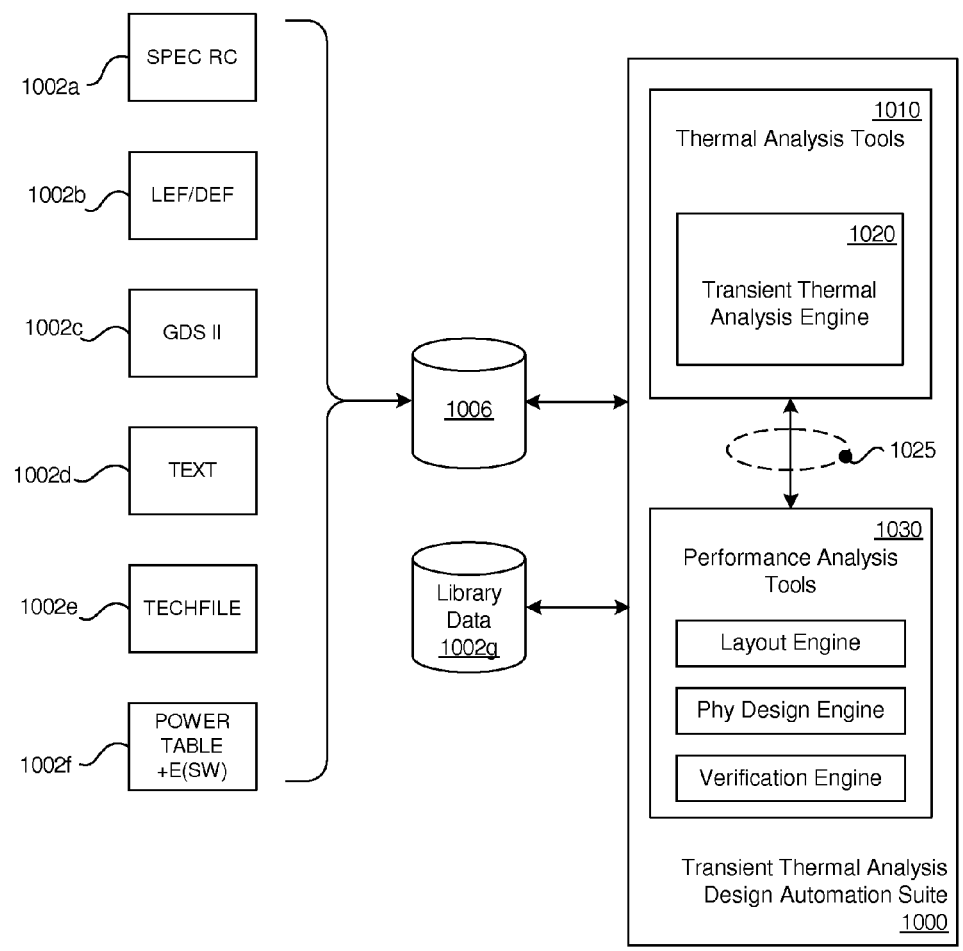
FIG. 10 illustrates selected components of an embodiment of a transient thermal analysis aware design automation suite and its related inputs, data, and output.

FIG. 10 illustrates selected components of Transient Thermal Analysis Design Automation Suite 1000 with related inputs, data, and output. As illustrated, Transient Thermal Analysis Design Automation Suite 1000 is adapted to receive a plurality of Inputs 1002a-1002g (hereinafter collectively referred to as "Inputs 1002") and process Inputs 1002 to produce a full-chip (e.g., three-dimensional) transient thermal analysis of a proposed semiconductor chip design.

In some embodiments, the plurality of Inputs 1002 includes industry standard design data 1002a-1002f (e.g., pertaining to the physical chip design or layout under consideration) and Library Data 1002g (e.g., pertaining to the semiconductor devices and interconnects incorporated in the design). The industry standard design data optionally includes one or more of the following types of data: electrical component extraction data and extracted parasitic data (e.g., embodied in SPEFs 1002a), design representations including layout data (e.g., embodied in LEF/DEF files 1002b, GDSII files 1002c and/or text files 1002d), manufacturer-specific techfiles 1002e describing layer information and package models, user-generated power tables 1002f including design data. For example, the design data includes switching factor information such as E(sw). For another example, the design data includes power source information used by transient thermal analysis. In some embodiments, industry standard design data 1002a-1002f is stored in a design database 1006 such as an open access database or a proprietary database. In some embodiments, Library Data 1002g is embodied in a library that is distributed by a semiconductor part manufacturer or a library vendor. In other embodiments, the library incorporating Library Data 1002g is built in-house by a user.

As illustrated, Transient Thermal Analysis Design Automation Suite 1000 includes Performance Analysis Tools 1030 and Thermal Analysis Tools 1010. The Performance Analysis Tools 1030 optionally include engines (software sub-systems) for providing layout, physical design, and verification services (callable tasks and procedures). For example, in some usage scenarios, a verification service includes a circuit simulator that is capable of interfacing to a thermal simulator. Thermal Analysis Tools 1030 include a Transient Thermal Analysis Engine 1020 and the tools are enabled to generate the full-chip transient thermal analysis of the semiconductor chip under design. The thermal and performance analysis tools are enabled to intercommunicate, as conceptually indicated by 1025.

In some embodiments, Transient Thermal Analysis Design Automation Suite 1000 includes routines and/or functions to perform one or more operations as illustrated and described with respect to one or more of FIGS. 1, 2, 3, 4, and 5, with communication between thermal and electrical simulators as indicated by 1025. For example, Transient Thermal Analysis Design Automation Suite 1000 includes one or more routines to perform iterative power and temperature computations as illustrated by FIG. 1. For another example, an embodiment of Thermal Analysis Tools 1010 has one or more routines to perform all or any portion of the first alternative transient thermal analysis technique as illustrated by FIG. 4, or the second alternative transient thermal analysis technique as illustrated by FIG. 5. Other arrangements of processing as illustrated and described elsewhere herein are contemplated.

Figure 11:
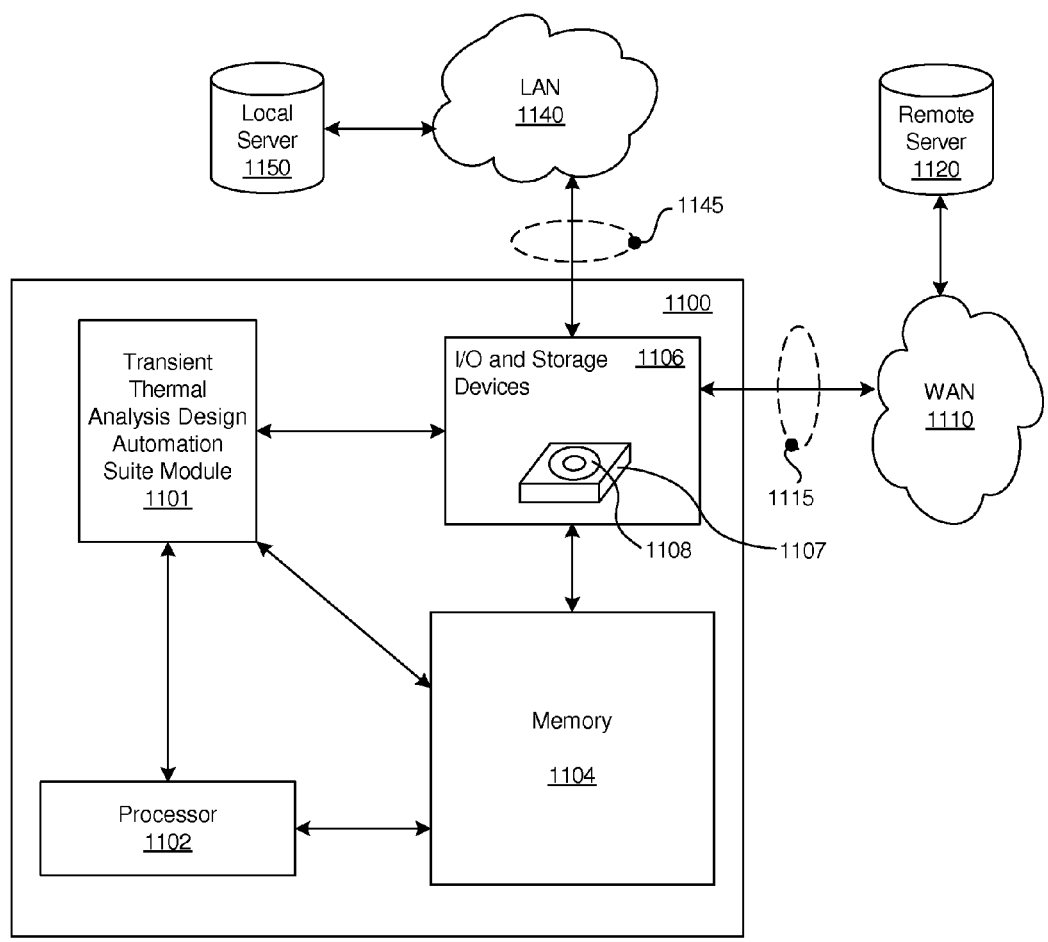
FIG. 11 illustrates a system environment associated with the transient thermal analysis aware design automation suite of FIG. 10.

FIG. 11 illustrates the system environment associated with the thermally aware design automation suite of FIG. 10. Computer System 1100 is a general purpose computing system such as a PC, Workstation, or Server, and includes a Processor 1102, a Memory 1104, Transient Thermal Analysis Design Automation Suite Module 1101, and various I/O and Storage Devices 1106. The I/O and Storage Devices include any combination of a display, a keyboard, a mouse, a modem, a network connection, a magnetic disk drive, an optical disk drive, and similar devices. In various embodiments, any or all of the aforementioned procedures (such as "Thermal Analysis Tools" 1010, "Transient Thermal Analysis Engine" 1020, and optionally portions of "Performance Analysis Tools" 1030) are implemented via Transient Thermal Analysis Design Automation Suite Module 1101. In some embodiments, all or any portion of Transient Thermal Analysis Design Automation Suite 1000 are implemented via Transient Thermal Analysis Design Automation Suite Module 1101.

In some embodiments, Transient Thermal Analysis Design Automation Suite Module 1101 is provided as a physical device or sub-system (such as a hardware accelerator) that is coupled to a processor through a communication channel. Alternatively, the module is provided as one or more software applications (or even a combination of software and hardware, e.g., using ASICs), where the software is loaded from a storage medium (such as from I/O and Storage Devices 1106) and executed as instructions by Processor 1102 via Memory 1104 of Computer System 1100. Thus, in some embodiments, Transient Thermal Analysis Design Automation Suite Module 1101, described herein with reference to the preceding figures, is stored on a computer readable medium (e.g., RAM, magnetic or optical drive or diskette, and similar storage media; see removable media 1107 and media reader 1108).

Additionally, the software optionally runs in a distributed or partitioned fashion on two or more computing devices similar to Computer System 1100. The collaborating computing devices are optionally linked via network connection 1145 to Local Area Network 1140 and via network connection 1115 to Wide Area Network 1110. Furthermore, networked Local Server 1150 and Remote Server 1120 are used, in various embodiments, for one or more of: library and data storage, program updates, license validation, and other uses.

Example Implementation Techniques

In some embodiments, various combinations of all or portions of functions as described by one or more of FIGS. 1, 2, 3, 4, and 5 are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java. VBscript, and Shell).

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A computer implemented method for transient thermal modeling of integrated circuits comprising:
   computing first respective power dissipations of respective elements of an integrated circuit in accordance with a first discrete simulation time interval;
   computing respective temperatures of the elements, based at least in part on the first respective power dissipations;
   computing second respective power dissipations of the elements based at least in part on the respective temperatures and in accordance with a second discrete simulation time interval;
   wherein the computing respective temperatures is in accordance with a third discrete simulation time interval;
   wherein the acts of computing are in accordance with advancement of simulation time;
   wherein the acts of computing are in accordance with a spatially-varying grid and a temporal grid;
   wherein the first discrete simulation time interval is later, with respect to the advancement of simulation time, than the second discrete simulation time interval; and
   further comprising adjusting a duration of at least one of the discrete simulation time intervals based at least in part on an error computed by one of the acts of computing.

2. The method of claim 1, wherein the elements comprise one or more of a transistor, all or any portion of an interconnect, all or any portion of analog circuitry, or all or any portion of digital circuitry.

3. The method of claim 1, wherein the computing first respective power dissipations is based at least in part on respective initial temperatures of the elements.

4. The method of claim 1, wherein the third discrete simulation time interval is coincident with at least one of the first and the second discrete simulation time intervals.

5. The method of claim 1, wherein the adjusting comprises decreasing the at least one discrete simulation time interval if the error is greater than a threshold.

6. The method of claim 1, wherein the adjusting comprises increasing the at least one discrete simulation time interval if the error is less than a threshold.

7. A system for transient thermal modeling of integrated circuits comprising:

a computer-readable medium having instructions stored therein;

a processor; and wherein execution of the instructions by the processor causes the processor to perform functions comprising computing first respective power dissipations of respective elements of an integrated circuit in accordance with a first discrete simulation time interval, computing respective temperatures of the elements, based at least in part on the first respective power dissipations, computing second respective power dissipations of the elements based at least in part on the respective temperatures and in accordance with a second discrete simulation time interval, wherein the computing respective temperatures is in accordance with a third discrete simulation time interval, wherein the acts of computing are in accordance with advancement of simulation time, wherein the acts of computing are in accordance with a spatially-varying grid and a temporal grid;

wherein the first discrete simulation time interval is later, with respect to the advancement of simulation time, than the second discrete simulation time interval, and further comprising adjusting a duration of at least one of the discrete simulation time intervals based at least in part on an error computed by one of the acts of computing.

8. The system of claim 7, wherein the functions further comprise repeatedly recomputing successive respective temperatures based at least in part on successive respective power dissipations that are computed in accordance with successive discrete simulation time intervals.

9. The system of claim 7, wherein the functions further comprise repeatedly recomputing successive respective power dissipations based at least in part on successive respective temperatures that are computed in accordance with successive discrete simulation time intervals.

10. The system of claim 7, wherein the first and the second discrete simulation time intervals are different lengths with respect to the advancement of simulation time.

* * * * *